United States Patent [19]

Denzinger et al.

[11] Patent Number: 5,714,560
[45] Date of Patent: Feb. 3, 1998

[54] WATER-SOLUBLE OR WATER-DISPERSIBLE GRAFT POLYMERS OF PROTEINS AS LEATHER TANNING AGENTS

[75] Inventors: Walter Denzinger, Speyer; Axel Kistenmacher, Ludwigshafen; Heinrich Hartmann, Limburgerhof; Günter Bernhardt, Ludwigshafen; Gerhard Wolf, Ketsch, all of Germany

[73] Assignee: BASF Aktiengesellschaft, Ludwigshafen, Germany

[21] Appl. No.: 737,329

[22] PCT Filed: May 6, 1995

[86] PCT No.: PCT/EP95/01720
§ 371 Date: Nov. 13, 1996
§ 102(e) Date: Nov. 13, 1996

[87] PCT Pub. No.: WO95/31576
PCT Pub. Date: Nov. 23, 1995

[30] Foreign Application Priority Data

May 13, 1994 [DE] Germany ............ 44 16 877.2

[51] Int. Cl.$^6$ .................. C14C 3/22; C08F 289/00
[52] U.S. Cl. .................. 527/201; 527/202; 8/94.1 R; 8/94.18; 8/94.19 R; 8/94.18 C; 8/94.33
[58] Field of Search .................. 8/94.1 R, 94.18, 8/94.19 R, 94.19 C, 98.33; 527/201, 202

[56] References Cited

U.S. PATENT DOCUMENTS

| | | | |
|---|---|---|---|
| 2,205,882 | 6/1940 | Graves | 149/5 |
| 3,651,210 | 3/1972 | Shepler et al. | 424/78 |
| 4,314,800 | 2/1982 | Monsheimer et al. | 8/94.1 R |
| 4,812,550 | 3/1989 | Erickson et al. | 527/201 |
| 5,425,784 | 6/1995 | Denzinger et al. | 8/94.33 |

Primary Examiner—Frederick Krass
Attorney, Agent, or Firm—Oblon, Spivak, McClelland, Maier & Neustadt, P.C.

[57] ABSTRACT

Water-soluble or water-dispersible graft polymers which are obtainable by free-radical-initiated polymerization of (A) a monomer or monomer mixture comprising
  (a) from 20 to 100% by weight of acrylic acid or methacrylic acid or a mixture thereof or alkali metal, alkaline earth metal or ammonium salts thereof,
  (b) from 0 to 80% by weight of other monoethylenically unsaturated monomers which can be copolymerized with the monomers (a), and
  (c) from 0 to 5% by weight of monomers containing at least 2 ethylenically unsaturated, non-conjugated double bonds in the molecule, in the presence of proteins (B)

in an A:B weight ratio of from (95 to 10):(5 to 90), are used as tanning agents for self-tanning, pretanning and assist tanning of pelts and skin pelts and for the retanning of leather and skin.

5 Claims, No Drawings

WATER-SOLUBLE OR WATER-DISPERSIBLE GRAFT POLYMERS OF PROTEINS AS LEATHER TANNING AGENTS

The present invention relates to the use of water-soluble or water-dispersible graft polymers of proteins which are obtainable by free-radical-initated polymerization of acrylic or methacrylic acid or salts thereof, if desired with further monomers, in the presence of proteins, as tanning agents in the production of leather and skins. The present invention furthermore relates to polymeric tanning agents based on these water-soluble or water-dispersible graft polymers.

In the production of leather, the main tanning is usually carried out using mineral tanning agents, such as basic chromium, aluminum and/or zirconium salts, or in combination with synthetic tanning agents. Subsequent retanning using natural or synthetic tanning agents serves to improve the leather properties, such as handle, softness, grain characteristics and body. Examples of tanning agents in retanning are syntans, i.e. water-soluble condensates of, for example, naphthylenesulfonic acid and formaldehyde or of phenolsulfonic acid, formaldehyde and urea, furthermore ligninsulfonic acids and also polymers and copolymers based on acrylic acid and other unsaturated polymerizable carboxylic acids, generally in combination with the above-mentioned syntans.

For the production of leather and skins having a fine grain and uniform coloring, GB-A 2,074,173 (1) and GB-A 2,137,654 (2) describe terpolymers comprising from 5 to 25% by weight of nitrogen-containing (meth)acrylates, from 67 to 92% by weight of (meth)acrylates and from 1 to 8% by weight of (meth)acrylic acid as tanning agents. These can also be grafted to water-soluble proteins or polysaccharides in order to reduce their tack.

U.S. Pat. No. 4,812,550 (3) discloses a process for the preparation of grafted proteins in which ethylenically unsaturated monomers containing not more than 14 carbon atoms in the molecule are subjected to free-radical polymerization in an aqueous medium in the presence of solubilized proteins. Acrylic acid and methacrylic acid are not mentioned as monomers. The resultant lattices are used, for example, as binders for pigmented paper sizing agents. U.S. Pat. No. 3,651,210 (4) discloses that specific emulsion copolymers containing from 1 to 10% by weight of (meth)acrylic acid can be reacted with solubilized proteins, and the proteins modified in this way can be used, for example, for coating leather.

These agents of the prior art have a number of disadvantages. In particular they cause the color of the leather and skins produced in this way to become excessively pale. In addition, they give poor lightfastness and heat resistance. They also impart an undesired rubber-like handle to the leather.

It is an object of the present invention to provide the leather industry with tanning agents for the production of leather and furs which do not have said disadvantages.

We have found that this object is achieved by water-soluble or water-dispersible proteins which are obtainable by free-radical-initiated polymerization of
(A) a monomer or monomer mixture comprising
  (a) from 20 to 100% by weight of acrylic acid or methacrylic acid or a mixture thereof or alkali metal, alkaline earth metal or ammonium salts thereof,
  (b) from 0 to 80% by weight of other monoethylenically unsaturated monomers which can be copolymerized with the monomers (a), and
  (c) from 0 to 5% by weight of monomers containing at least 2 ethylenically unsaturated, non-conjugated double bonds in the molecule, in the presence of proteins (B)
in an A:B weight ratio of from (95 to 10):(5 to 90). These proteins can be used as tanning agents for self-tanning, pretanning and assist tanning of leather pelts and skin pelts and for the retanning of leather and skins.

These water-soluble or water-dispersible graft polymers are thus obtainable by homopolymerization or copolymerization of the monomers A in the presence of the natural materials B.

Suitable monomers A from group (a) are (meth)acrylic acid and the alkali metal, alkaline earth metal and ammonium salts thereof. It is also possible to use mixtures thereof. These salts are obtainable, for example, from (meth)acrylic acid by neutralizing the acid in aqueous solution using sodium hydroxide solution, potassium hydroxide solution, lithium hydroxide solution, magnesium hydroxide solution, ammonia, amines or alkanolamines.

The monomers A from group (a) can, if desired, be subjected to the graft copolymerization together with other monoethylenically unsaturated monomers (b) which are copolymerizable with the monomers (a). The proportion of the monomers (a) in the monomer mixture A is then from 20 to 100% by weight, preferably from 40 to 100% by weight, while the monomers (b) can be present therein in an amount of up to 80% by weight, preferably up to 60% by weight.

The monomers A from group (b) which are used in the graft polymerization include, in particular, crotonic acid, maleic acid, maleic anhydride, fumaric acid, citraconic acid, citraconic anhydride, $C_1$- to $C_8$-alkyl and -hydroxyalkyl esters of acrylic acid, methacrylic acid or crotonic acid and mono- or di-$C_1$- to $C_8$-alkyl or -hydroxyalkyl esters of maleic acid, fumaric acid or citraconic acid, for example methyl acrylate, ethyl acrylate, n-butyl acrylate, methyl methacrylate, monomethyl maleate, dimethyl maleate, monoethyl maleate, diethyl maleate, β-hydroxyethyl acrylate, β- and γ-hydroxypropyl acrylate, δ-hydroxybutyl acrylate, β-hydroxyethyl methacrylate and β- and γ-hydroxypropyl methacrylate.

Furthermore, the amides and N-substituted alkylamides of the compounds indicated under (a) are suitable as monomers A from group (b), for example, acrylamide, methacrylamide, N-alkyl(meth)acrylamides having 1 to 18 carbon atoms in the alkyl group, for example N-methylacrylamide, N,N-dimethylacrylamide, N-tert-butylacrylamide, N-octadecylacrylamide, dimethylaminopropylmethacrylamide and acrylamidoglycolic acid. Also suitable as monomers (b) are alkylaminoalkyl (meth)acrylates, for example β-(dimethylamino)ethyl acrylate, β-(dimethylamino)ethyl methacrylate, β-(diethylamino)ethyl acrylate, β-(diethylamino)ethyl methacrylate, γ-(diethylamino)propyl acrylate and γ-(diethylamino)propyl methacrylate.

Also suitable as monomers A from group (b) are sulfo-containing monomers, for example vinylsulfonic acid, allylsulfonic acid, methallylsulfonic acid, styrenesulfonic acids, 3-sulfopropylacrylate, 3-sulfopropyl methacrylate and acrylamidomethylpropanesulfonic acid, and phosphonoyl-containing monomers, for example vinylphosphonic acid, allylphosphonic acid and acrylamidomethylpropanephosphonic acid.

This group (b) of monomers A also includes N-vinylpyrrolidone, N-vinylcaprolactam, N-vinylformamide, N-vinyl-N-methylformamide, 1-vinylimidazol, 1-vinyl-2-methylimidazol, vinyl acetate and vinyl propionate, acrylonitrile and methacrylonitrile, acrolein and methacrolein, crotonaldehyde and acetals thereof.

Suitable monomers A from group (b) also include esters of alkoxylated $C_1$- to $C_{18}$-alcohols which have been reacted with from 2 to 50 mol of ethylene oxide, propylene oxide, butylene oxide or mixtures thereof, with the monoethylenically unsaturated carboxylic acids from group (a), for example the esters of acrylic acid or methacrylic acid with a $C_{13/15}$-alcohol which has been reacted with various amounts of ethylene oxide, for example 3 mol, 5 mol, 7 mol, 10 mol or 30 mol of ethylene oxide.

Suitable monomers A from group (b) also include vinylaromatic compounds, such as styrene and α-methylstyrene, and $C_1$- to $C_{12}$-olefins, for example ethylene, propylene, 1-butene, 2-butene and butadiene.

Suitable monomers A from group (b) also include N-mono- and N,N-disubstituted amides of monoethylenically unsaturated $C_3$- to $C_8$-carboxylic acids, where the amide nitrogen carries, as substituents, polyoxyalkylated $C_2$- to $C_{28}$-alkanols, in particular $C_2$- to $C_{18}$-alkanols, which have been reacted with from 2 to 100 mol, in particular from 3 to 20 mol, of ethylene oxide, propylene oxide and/or butylene oxide. Examples of such compounds are

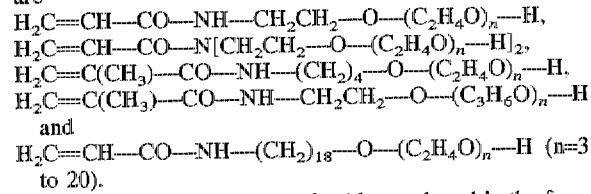

$H_2C{=}CH{-}CO{-}NH{-}(CH_2)_{18}{-}O{-}(C_2H_4O)_n{-}H$ (n=3 to 20).

Basic monomers (b) are preferably employed in the form of their salts with mineral acids, for example hydrochloric acid, sulfuric acid or nitric acid, or in quaternized form. Examples of suitable quaternizing agents are dimethyl sulfate, diethyl sulfate, methyl chloride, ethyl chloride and benzyl chloride. Carboxylic acids (b) are employed in the form of the free acids or as the alkali metal, alkaline earth metal or ammonium salts, or mixtures thereof.

Preferred components (b) of the monomer mixture A for the preparation of the graft polymers are crotonic acid, maleic acid, maleic anhydride, fumaric acid, citraconic acid, citraconic anhydride, $C_1$- to $C_8$-, in particular $C_1$- to $C_4$-alkyl or -hydroxyalkyl esters of acrylic acid, methacrylic acid or crotonic acid, mono- or di-$C_1$- to $C_3$-, in particular $C_1$- to $C_4$-alkyl or -hydroxyalkyl esters of maleic acid, fumaric acid or citraconic acid, acrylamide, methacrylamide, methacrolein, acrylamidomethylpropanesulfonic acid, N-vinylimidazol or a mixture thereof.

A further modification of the graft polymers can be achieved by carrying out the graft polymerization in the presence of monomers A from group (c). In this case, the monomer mixtures contain up to 5% by weight of a monomer containing at least two ethylenically unsaturated, non-conjugated double bonds in the molecule. These compounds are usually used as crosslinking agents in copolymerizations. They can be added to the monomers from group (a) used for the copolymerization or to the monomer mixtures of (a) and (b). If used, the preferred amount of monomers (c) is from 0.05 to 2% by weight. The concomitant use of monomers A from group (c) during the copolymerization generally causes an increase in the K values of the copolymers.

Examples of suitable compounds (c) are methylenebisacrylamide, esters of acrylic acid and methacrylic acid with polyhydric alcohols, for example glycol diacrylate, glycerol triacrylate, ethylene glycol dimethacrylate, glycerol trimethacrylate and polyols such as pentaerythritol and glucose which have been at least di-esterified by means of acrylic acid or methacrylic acid. Suitable representatives also include divinylbenzene, divinyldioxane, pentaerythritol triallyl ether and pentaallylsucrose. Preference is given from this group of compounds to water-soluble monomers, in particular ethylene glycol diacrylate or glycol diacrylates of polyethylene glycols having a molecular weight of up to 3000, or a mixture thereof.

In a preferred embodiment, the monomer A used for the preparation of the graft polymers is methacrylic acid or an alkali metal, alkaline earth metal or ammonium salt thereof, or the monomer mixture A is a mixture of at least 80% by weight of methacrylic acid or an alkali metal, alkaline earth metal or ammonium salt thereof, and monomers (b).

The polymerization of the monomers A is carried out in the presence of natural substances B based on proteins and derivatives thereof. The natural substances are, for example, proteins of vegetable or animal origin which are already dispersible or soluble in water or alkalis or become dispersible or soluble during polymerization of the monomers A directly or after partial or full neutralization by means of alkalis, ammonia or amines.

Suitable for this purpose are all proteins of which a proportion of at least 20% by weight dissolves in the polymerization medium under the polymerization conditions. Examples of suitable proteins are those described in (3). A further review of suitable proteins is given in Ullmanns Enzyklopädie der technischen Chemie, 4th Edition, Weinheim, 1980, Volume 19, pp. 491 to 557.

The proteins are renewable raw materials. They originate, for example, from skins, supporting and connecting tissue, bones and cartilage, for example collagen, elastin, gelatin, ossein and skin glue. Proteins from milk are dairy proteins, casein and lactalbumin. Wool, bristles, feathers and hairs give keratin. Also suitable are proteins from fish and eggs and from blood as abbatoir waste, for example blood proteins, albumin, globulin, globin, fibrinogen and haemoglobin. Other suitable proteins originate from plants, such as corn, wheat, barley and oats, for example glutelin, prolamin, zein and gluten. In addition, proteins can be obtained from seed, for example from soybean, cottonseed, groundnuts, sunflowers, rape, coconuts, linseed, sesame, saflour, peas, beans and lentils. In addition, the protein constituents of clover, alfalfa, grass, potatoes, cassava and yam may be used. Other protein sources are bacteria, fungi, algae and yeasts, for example Pseudomonas, Lactobacillus, Penicillium, blue algae, green algae, Chlorella, Spirulina and surplus yeast. Preferred proteins as component B for the preparation of the graft copolymers are casein, gelatin, bone glue, proteins from soybeans, cereals, in particular wheat and corn, and peas.

The proteins are obtained from the natural raw materials by, for example, dissolution, grinding, screening and classification. In order to convert them into a soluble form, it is in many cases necessary to carry out digestion by physical, chemical or enzymatic treatment, for example hydrolysis with acid or alkalis, fermentation with yeasts, bacteria or enzymes, extraction methods in order to remove minor constituents, coagulation from extracts by heating, addition of electrolyte, pH adjustment or addition of precipitants. Pure products can be prepared by, for example, fractional dissolution and precipitation or by dialysis.

The preferred protein is, for economic reasons, bone glue. Components (A) and (B) are employed in a weight ratio of from (95 to 10):(5 to 90), preferably from (90 to 15):(10 to 85), in particular from (55 to 20):(45 to 80).

In order to prepare the graft polymers, the monomers A are subjected to free-radical-initiated polymerization in the presence of the protein component B. It may in some cases be favorable for the action of the resultant graft polymer to use two or more of the compounds mentioned under B, for example protein mixtures containing bone glue, such as mixtures of bone glue and gelatin or bone glue and casein.

The polymerization can be carried out in the presence or absence of inert solvents or inert diluents. Since the polymerization in the absence of inert solvents or diluents in some cases gives non-uniform graft polymers, the graft polymerization is preferably carried out in an inert solvent or diluent. Examples of suitable inert diluents are those in which the compound B can be suspended and which dissolve the monomers A. In these cases, the graft polymers are in suspended form after the polymerization and can easily be isolated in solid form by filtration.

Examples of suitable inert diluents are toluene, o-, m- and p-xylene and isomer mixtures thereof, ethylbenzene, aliphatic hydrocarbons or gasoline fractions containing no polymerizable monomers, also chlorinated hydrocarbons, such as chloroform, tetrachloromethane, hexachloroethane, dichloroethane and tetrachloroethane.

In the procedure described above, in which component B is suspended in an inert diluent, it is preferred to use anhydrous compounds of component B and to use anhydrides of dicarboxylic acids as the compounds from group (b) of the monomers A.

A preferred process for preparing the graft polymers is solution polymerization, in which the protein component B, the monomers A and the resultant graft copolymer are at least in dispersed form and in many cases even in dissolved form. Examples of suitable inert solvents for the solution polymerization are methanol, ethanol, isopropanol, n-propanol, n-butanol, sec-butanol, tetrahydrofuran, dioxane and mixtures thereof.

The polymerization can be carried out continuously or batchwise. Components A and B can, as mentioned above, also be polymerized in the absence of inert diluents or solvents. Continuous polymerization at from 160° to 250° C. is particularly appropriate here. If desired, it is possible to carry out this polymerization in the absence of polymerization initiators. However, initiators which form free radicals under the polymerization conditions, for example inorganic or organic peroxides, persulfates, azo compounds or redox catalysts, are preferably also used here.

The water-soluble or water-dispersible graft polymers described are generally prepared in the presence of free-radical-forming initiators. Suitable free-radical-forming initiators are preferably all compounds which have a half value period of less than 3 hours at the particular polymerization temperature selected. If the polymerization is commenced at relatively low temperature and completed at elevated temperature, it is expedient to use at least two initiators which decompose at different temperatures, namely firstly to use an initiator which decomposes at relatively low temperature for the commencement of the polymerization and then to complete the main polymerization with an initiator which decomposes at elevated temperature. It is possible to use water-soluble or water-insoluble initiators or mixtures of water-soluble and water-insoluble initiators. The water-insoluble initiators are then normally soluble in the organic phase.

The initiators listed below can advantageously be used for the temperature ranges shown:

Temperature: 40° to 60° C.:
acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy2,4-dimethylvaleronitrile), 2,2'-azobis(2-methyl-N-phenylpropionamidine) dihydrochloride and 2,2'-azobis (2-methylpropionamidine) dihydrochloride;

Temperature: 60° to 80° C.:
tert-butyl perpivalate, dioctanoyl peroxide, dilauroyl peroxide and 2,2'-azobis(2,4-dimethylvaleronitrile);

Temperature: 80° to 100° C.:
dibenzoyl peroxide, tert-butyl per-2-ethylhexanoate, tert-butylpermaleate, 2,2'-azobis(isobutyronitrile), dimethyl-2,2'-azobisisobutyrate, sodium persulfate, potassium persulfate and ammonium persulfate;

Temperature: 100° to 120° C.:
bis(tert-butylperoxy)cyclohexane, tert-butyl peroxyisopropylcarbonate, tert-butyl peracetate and hydrogen peroxide;

Temperature: 120° to 140° C.:
2,2'-bis(tert-butylperoxy)butane, dicumyl peroxide, di-tert-amylperoxide and di-tert-butyl peroxide;

Temperature: >140° C.:
p-menthane hydroperoxide, pinane hydroperoxide, cumene hydroperoxide and tert-butyl hydroperoxide.

If, in addition to said initiators, use is also made of salts or complexes of heavy metals, for example copper, cobalt, manganese, iron, vanadium, cerium, nickle or chromium salts, or organic compounds, such as benzoin, dimethylanilin or ascorbic acid, the half value periods of the free-radical-forming initiators mentioned can be reduced. Thus, for example, tert-butyl hydroperoxide can be activated on addition of 5 ppm of copper(II) acetylacetonate sufficiently that the polymerization can be carried out at as low as 100° C. The reducing component of redox catalysts can also be formed, for example, from compounds such as sodium sulfite, sodium bisulfite, sodium formaldehyde sulfoxylate and hydrazine.

Based on the monomers A employed in the polymerization, from 0.01 to 20% by weight, preferably from 0.05 to 15% by weight, of a polymerization initiator or of a mixture of a plurality of polymerization initiators is used. The redox components are added to the reducing compounds in an amount of from 0.01 to 30% by weight. Heavy metals are used in an amount in the range from 0.1 to 100 ppm, preferably from 0.5 to 10 ppm. It is frequently advantageous to use a combination of peroxide, reducing agent and heavy metal as redox catalyst.

The polymerization of the monomers A can also be carried out by exposure to ultra-violet radiation, if desired in the presence of UV initiators. For polymerization with exposure to UV rays, the photoinitiators or sensitizers usually suitable for this purpose are used. These are, for example, compounds such as benzoin or benzoin ether, α-methylbenzoin or α-phenylbenzoin. It is also possible to use so-called triplet sensitizers, for example benzyl diketals. The UV radiation sources used can be, for example, high-energy UV lamps, such as carbon arc lamps, mercury vapor lamps and xenon lamps, or alternatively low-UV light sources, such as fluorescent tubes with a high blue content.

In order to prepare polymers having a low K value, the graft polymerization is expediently carried out in the presence of regulators. Examples of suitable regulators are mercapto compounds, for example mercaptoethanol, mercaptopropanol, mercaptobutanol, mercapto acetic acid, mercaptopropionic acid, butyl mercaptan and dodecyl mercaptan. Other suitable regulators are allyl compounds, for example allyl alcohol, aldehydes, such as formaldehyde, acetaldehyde, propionaldehyde, n-butyraldehyde and isobutyraldehyde, formic acid, ammonium formate, propionic acid, hydrazine sulfate and butenols. If the polymerization is carried out in the presence of regulators, from 0.05 to 20% by weight thereof, based on the monomers A employed in the polymerization, are required.

In order to prepare colorless or only weakly colored graft polymers from components A and B, the polymerization is expediently carried out in the presence of water-soluble phosphorus compounds in which the phosphorus has an oxidation number of from 1 to 4, water-soluble alkali metal or ammonium salts thereof, water-soluble compounds containing $PO(OH)_2$ groups and/or water-soluble salts thereof. Preference is given to phosphorous and hypophosphorous acid. The suitable phosphorus compounds are used in amounts from 0.01 to 5% by weight, based on the monomer A employed, for reducing the discoloration of the graft polymers. The suitable phosphorus compounds are described, for example, in EP-A 175 317.

The polymerization of components A and B is usually carried out under an inert-gas atmosphere with exclusion of atmospheric oxygen. During the polymerization, good mixing of the reactants is generally ensured. In the case of relatively small batches, in which reliable dissipation of the heat of polymerization is guaranteed, the reactants, which are preferably in an inert diluent, can be polymerized batchwise by heating the reaction mixture to polymerization temperature. This temperature is usually in the range from 30° to 180° C. However, this method sometimes gives graft polymers which are somewhat non-uniform per se and therefore cannot achieve their optimum effectiveness.

In order to enable better control of the course of the polymerization reaction, the monomers A are therefore added to the polymerization mixture continuously or in portions, after initiation of the polymerization, in such amounts that the graft polymerization is readily controllable in the desired temperature range. The preferred manner of addition of the monomers A is first to introduce component B or at least some of component B into the polymerization reactor and to heat it to the desired polymerization temperature with stirring. As soon as this temperature has been reached, the monomers A and the initiator and, if desired, a regulator are added over a period of from about 1 to 10 hours, preferably from 2 to 8 hours. This type of procedure is advantageously used, for example, in the polymerization of components A and B in an inert diluent in which component B is suspended and in graft polymerization carried out in solution.

The graft polymers are preferably prepared by suspension or solution polymerization of components A and B in an aqueous medium, with solution polymerization in water being particularly preferred. In the case of solution polymerization in an aqueous medium, an illustrative procedure is to introduce component B into the aqueous medium, to warm the mixture to the desired polymerization temperature, and to add the monomer A continuously or in portions to the polymerizing reaction mixture. The pH of the batch can be in the range from 0.5 to 14. The (meth)acrylic acid (a) is used in the acid form at low pH and in the salt form at high pH.

Particularly effective polymers with a particularly low degree of coloration are obtained if the polymerization is carried out in the pH range from 4 to 8. This can be effected by adjusting the acid groups to the desired pH before the polymerization or by keeping the pH constant during the polymerization by constant addition of neutralizers. Particularly suitable neutralizers are sodium hydroxide solution, potassium hydroxide solution, ammonia, ethanolamine, diethanolamine and triethanolamine. For solution polymerization in water, water-soluble initiators or initiator systems are particularly preferred. In a particularly preferred preparation procedure, only water is initially introduced into the reactor, and component A, if desired in partially or fully neutralized form, and B are added in portions or continuously at the selected polymerization temperature over the course of from 0.5 to 10 hours.

In the preparation of graft polymers in which component (b) of the monomers A is a monoethylenically unsaturated dicarboxylic acid, it is important, in particular in order to obtain graft polymers having a low content of unpolymerized dicarboxylic acid, to control the degree of neutralization of the monomers during the copolymerization. The degree of neutralization of the monomers should be from 20 to 80%, preferably from 30 to 70%, during the graft polymerization. To this end, for example, the monomers A from group (a) and (b) can be partially neutralized, so that their degree of neutralization is in each case in the stated range. However, it is also possible to neutralize all or about 90% to 100% of the monomeric dicarboxylic acid from group (b) introduced into the reactor and to add the monomers from (a) in un-neutralized form, so that the overall degree of neutralization of the monomers (a) and (b) drops during the polymerization from initially about 100% or about 90 to 100% to values in the range from 20 to 80%. In order to maintain a certain degree of neutralization of the monomers (a) and (b), a base, for example sodium hydroxide solution, potassium hydroxide solution, ammonia or ethanolamine, can be added during copolymerization. Depending on the composition of the graft polymers, the majority, i.e. from 60 to 80%, of the monomers (a) and (b) are polymerized at a degree of neutralization of from 20 to 80%.

As mentioned above, it is also possible to subject proteins in aqueous suspension to the graft polymerization.

The respective proteins employed in the graft polymerization can also be chemically modified in various ways before or after the graft polymerization. For example, it may be advantageous for the protein to be partially degraded hydrolytically or enzymatically before polymerization. Depending on the reaction conditions, partial hydrolytic degradation of the proteins can take place during the graft polymerization. The graft polymers can also be modified in various ways after the graft polymerization, for example graft polymers of alkyl acrylates on proteins can be hydrolyzed with elimination of alcohol.

Functional groups of the proteins can also be reacted with reactive carboxylic acid derivatives, for example carboxylic anhydrides, before or after the free-radical grafting. Examples of these carboxylic anhydrides are acetic anhydride, succinic anhydride and maleic anhydride.

The temperatures during the graft polymerization are usually in the range from 30° to 180° C., preferably from 60° to 150° C. As soon as the temperature is above the boiling point of the inert diluent or solvent or of the monomers A, the polymerization is carried out under pressure. The concentration of components A and B in the case of polymerization in the presence of inert solvents or inert diluents is generally from 10 to 80% by weight, preferably from 20 to 70% by weight.

The preparation of the graft polymers can be carried out in conventional polymerization reactors, for example stirred reactors fitted with an anchor, paddle, impeller or multistage pulse countercurrent stirrer. In particular in the case of graft polymerization in the absence of diluents, it may be advantageous to carry out the polymerization in a compounder. It may also be necessary to carry out the polymerization in a compounder if high concentrations are used or if the natural substances B are of high molecular weight and initially swell greatly.

The processes described give water-soluble or water-dispersible graft polymers having Fikentscher K values of from 8 to 300 (measured on 0.1 or 1% strength by weight aqueous solutions of the polymers at pH 7 and 25° C.). The preferred K values for the application in accordance with the invention are in the range from 10 to 260, in particular 30 to 250.

The graft polymers which can be prepared by the processes described are colorless to brownish products. In the case of polymerization in an aqueous medium, they are in the form of dispersions or polymer solutions. Depending on the particular composition or concentration of the graft polymers, these are low-viscosity to pasty aqueous solutions or dispersions. Owing to the natural substance content, the graft polymers described above have better biodegradability than the polymers based on ethylenically unsaturated monomers that have been used hitherto, or can at least be eliminated from the water treatment plant effluent with the sewage sludge.

The aqueous graft polymer solutions or dispersions obtainable in this way are highly suitable as tanning agents in the production of leather and furs.

For example, the graft polymers used in accordance with the present invention can be used for the self-tanning and pretanning of leather pelts and skin pelts in aqueous liquor. Particularly advantageous for these applications are graft polymers built up from methacrylic acid or salts thereof alone or from a monomer mixture A of methacrylic acid or salts thereof (a) and monomers (b) containing at least 80% of (a).

In the self-tanning and pretanning of leather pelts and skin pelts, an advantageous procedure is to treat the pickled leather pelts, for example cattle pelts having a split thickness of from 1.5 to 4 mm, or skin pelts, for example sheepskin pelts, with an aqueous solution of the graft polymers at a pH of from 2 to 7, in particular from 2.5 to 4, and at from 15° to 40°, in particular from 20° to 35° C., for a period of from 3 to 20 hours. The treatment takes the form for example of milling in a drum. The requisite amount of graft polymer according to the invention is normally, based on the leather pelt weight, from 2 to 30% by weight, in particular from 5 to 25% by weight. The liquor length, ie. the percentage weight ratio of treatment liquor to goods, is customarily from 30 to 200% in the case of leather pelts or from 100 to 2000% in the case of skin pelts, in either case based on the pelt weight.

On completion of the treatment the leather or skin is customarily brought to a pH of from 2 to 8, in particular 3 to 5, using for example magnesium oxide, sodium carbonate, sodium bicarbonate, or an organic acid, such as formic acid or a salt thereof, if desired treated with further tanning agents and, on completion of the tanning process, optionally dyed and fatliquored.

The graft polymers used in accordance with the present invention can furthermore be used for assist tanning leather pelts and skin pelts together with the tanning agents of the main tannage, which can be for example a chrome or aluminum tannage. In this case the working conditions concerning pH, temperature and duration of treatment are adjusted to the requirements of the main components of the tanning; the same applies to the treatment apparatus and the liquor length and also to the aftertreatment. In this case the requisite amount of graft polymers used in accordance with the present invention is normally, based on the leather pelt weight, from 0.1 to 20% by weight, in particular from 0.5 to 15% by weight.

The graft polymers used in accordance with the present invention can also be used for retanning previously tanned leather and skin, for example chrome tanned leather, in an aqueous liquor. This is generally carried out by tanning the pickled leather pelts and skins, for example cattle pelts having split thicknesses of from 1.5 to 4 mm, with for example a customary chromium-containing tanning agent such as a chromium(III) salt, eg. chromium(III) sulfate, in a conventional manner, deacidifying the resulting pretanned hides (wet blues in the case of chrome tanning) and treating the deacidified hides at a pH of from 2 to 7, in particular from 2.5 to 6, and at from 15° to 60° C., in particular at from 25° to 45° C., with an aqueous solution of the graft polymers used in accordance with the present invention for a period of from 1 to 12 hours. This treatment takes the form for example of milling in a drum. The requisite amount of graft polymer used in accordance with the present invention is normally, based on the shaved weight of the leather, from 2 to 30% by weight, in particular from 5 to 25% by weight. The liquor length is customarily from 30 to 200% in the case of leather pelts or from 100 to 2000% in the case of skin pelts, in either case based on the shaved weight of the leather.

After the treatment and if necessary also beforehand, the leather or skin is customarily adjusted to a pH of from 3 to 5, using for example magnesium oxide or an organic acid, such as formic acid, or salts thereof, and toward the end or after the treatment it is if desired dyed and fatliquored.

The leather or skin which has been retanned in this way may have been additionally treated with other tanning agents such as polymer tanning agents or syntans prior to the retanning with the graft polymers used in accordance with the present invention. Moreover, the graft polymers used in accordance with the present invention can be used simultaneously with such additional tanning agents, for example in the main tannage.

Suitable additional or simultaneous tanning agents are all customary agents having a tanning effect on leather pelts or skin pelts. A comprehensive treatment of such tanning agents may be found for example in Ullmanns Encyklop_adie der technischen Chemie, 3rd Edition, Volume 11, pages 585 to 612 (1960). Specific tanning agent classes which may be mentioned are the mineral tanning agents, for example chromium, aluminum, titanium or zirconium salts, the synthetic tanning agents such as the abovementioned polymer tanning agents and syntans, and the vegetable (plant derived) tanning agents.

The present invention furthermore relates to polymeric tanning agents for the self-tanning, pretanning and assist tanning of leather pelts and skin pelts and for the retanning of leather and skin which are based on water-soluble or water-dispersible graft polymers of proteins obtainable by free-radical-initiated polymerization of (A) a monomer or monomer mixture comprising
   (a) from 20 to 100% by weight of acrylic acid or methacrylic acid or a mixture thereof or alkali metal, alkaline earth metal or ammonium salts thereof,
   (b) from 0 to 80% by weight of other monoethylenic unsaturated monomers which are copolymerizable with the monomers (a), and
   (c) from 0 to 5% by weight of monomers containing at least 2 ethylenically unsaturated, non-conjugated double bonds in the molecule in the presence of proteins (B) in an A:B weight ratio of from (95 to 10):(5 to 90).

The (in particular chrome-pretanned) leather and skins produced using the graft polymers used in accordance with the present invention have extremely high light fastness and heat resistance and are distinguished by very good body, high softness and good firm grain.

In addition, the graft polymers used in accordance with the present invention give, when used as described, a very dark coloration. Leather and skins produced using the graft polymers used in accordance with the present invention by self-tanning or also, for example, by retanning chrome tanned leather are very intensely colored, and at the same time very uniform and level dyeings are achieved.

A particular advantage of the graft polymers used in accordance with the present invention is that, in contrast to conventional syntans, they contain no health-endangering unsulfonated phenols as residual monomers and have better biodegradability, or can at least be eliminated better from treatment plant effluent together with the sewage sludge, than conventional polymeric tanning agents owing to the incorporation of natural substances, namely protein component B.

EXAMPLES

Unless otherwise stated, percentages relate to the weight.

The K values of the polymers were determined by the method of H. Fikentscher, Cellulose-Chemie 13, pp. 58–64 and pp. 71–74 (1932), at a temperature of 25° C. on aqueous polymer solutions.

The solids contents were determined by drying for two hours at 80° C. under reduced pressure.

Preparation of the Graft Polymers

Example 1

A stirred reactor fitted with reflux condenser, nitrogen inlet and feed devices was charged with 180 g of bone glue and 527 g of distilled water, and the mixture was heated to 85° C. under a gentle stream of nitrogen. A mixture of 270 g of methacrylic acid and 200 g of distilled water and a solution of 8.1 g of sodium persulfate in 100 g of distilled water were then metered in at a uniform rate over the course of 3 hours at 85° C. The very viscous suspension was then neutralized by means of 250 g of 50% strength sodium hydroxide solution and cooled, giving a slightly cloudy, yellowish, viscous solution having a pH of 7.2 and a solids content of 35.2%. The K value of the polymer, measured on a 1% strength solution in water, was 84.

Example 2

135 g of bone glue and 527 g of distilled water were heated to 85° C. under a gentle stream of nitrogen in a reactor as in Example 1. A mixture of 315 g of methacrylic acid and 200 g of distilled water and a solution of 9.45 g of sodium persulfate in 100 g of distilled water were then metered in at a uniform rate over the course of 3 hours at 85° C. The mixture was heated at 85° C. for a further hour and neutralized to a pH of 6.9 by means of 275 g of 50% strength sodium hydroxide solution. The solids content of the solution was 34.4%. The K value of the polymer, measured on a 1% strength solution in water, was 82.2.

Example 3

90 g of bone glue and 530 g of distilled water were heated to 85° C. under a gentle stream of nitrogen in a reactor as in Example 1, and a mixture of 360 g of methacrylic acid and 200 g of distilled water and a solution of 10.8 g of sodium persulfate in 100 g of distilled water were metered in at a uniform rate over the course of 3 hours. The mixture was subsequently heated at 85° C. for a further hour and then neutralized to a pH of 7.0 by means of 325 g of 50% strength sodium hydroxide solution. Cooling gave a cloudy, yellowish solution having a solids content of 34.7%. The K value of the polymer, measured on a 1% strength solution in water, was 80.6.

Example 4

225 g of bone glue and 527 g of distilled water were heated to 85° C. under a gentle stream of nitrogen in a reactor as in Example 1. A mixture of 225 g of methacrylic acid and 200 g of distilled water and a solution of 6.75 g of sodium persulfate in 100 g of distilled water were then metered in at a uniform rate over the course of 3 hours at 85° C. The mixture was subsequently heated for a further hour and then neutralized to a pH of 6.9 by means of 275 g of 50% strength sodium hydroxide solution. Cooling gave a yellow, viscous solution having a solids content of 35.2%. The K value of the polymer, measured on a 1% strength solution in water, was 85.7.

Example 5

180 g of bone glue and 527 g of distilled water were heated to 85° C. under a gentle stream of nitrogen in a reactor as in Example 1. A mixture of 270 g of acrylic acid and 200 g of distilled water and a solution of 8.1 g of sodium persulfate in 100 g of distilled water were metered in at a uniform rate over the course of 3 hours at 85° C. The mixture was subsequently heated for a further hour and then neutralized to a pH of 6.8 by means of 280 g of 50% strength sodium hydroxide solution. The very viscous solution was subsequently diluted to a solids content of 25.2% with 500 g of distilled water. The K value of the polymer, measured on a 0.1% strength solution in water, was 256.4.

Example 6

180 g of bone glue and 527 g of distilled water were heated to 85° C. under a gentle stream of nitrogen in a reactor as in Example 1, and a mixture of 135 g of acrylic acid, 135 g of methacrylic acid and 200 g of distilled water and a solution of 8.1 g of sodium persulfate in 100 g of distilled water were metered in at a uniform rate over the course of 3 hours. The mixture was subsequently heated for a further hour and then neutralized to a pH of 6.5 by means of 255 g of 50% strength sodium hydroxide solution. After cooling, the yellow, cloudy, viscous solution had a solids content of 34.8%. The K value of the polymer, measured on a 1% strength solution in water, was 107.

Example 7

135 g of bone glue and 527 g of distilled water were heated to 85° C. under a gentle stream of nitrogen in a reactor as in Example 1. A mixture of 315 g of acrylic acid and 200 g of distilled water and a solution of 9.45 g of sodium persulfate in 100 g of distilled water were then metered in at a uniform rate over the course of 3 hours at 85° C. The mixture was subsequently heated for a further hour and then neutralized to a pH of 8.4 by means of 330 g of 50% strength sodium hydroxide solution. The virtually gelatinous solution was subsequently diluted to a solids content of 22.5% with 700 g of distilled water. The K value of the polymer was 252 (measured on a 0.1% strength solution in water).

Example 8

135 g of bone glue and 533 g of distilled water were heated to 80° C. under a stream of nitrogen in a reactor as in Example 1. A mixture of 258 g of acrylic acid, 57 g of dimethylaminoethyl acrylate and 200 g of distilled water and a solution of 3.15 g of 2,2'-azobis(2-methylpropionamidine) dihydrochloride in 100 g of distilled water were then metered in at a uniform rate over the course of 4 hours at 85° C. The mixture is subsequently heated for a further hour and then neutralized by means of 240 g of 50% strength sodium hydroxide solution. After cooling, the polymer solution had a pH of 7.1 and a solids content of 33.7%. The K value of the polymer, measured on a 1% strength solution in water, is 85.4.

Example 9

189.5 g of acrylic acid and 125.5 g of dimethylaminoethyl acrylate and 130 g of 50% strength sodium hydroxide solution for neutralization were reacted analogously to Example 8. The polymer 25 solution had a pH of 6.8 and a solids content of 33.4%. The K value of the polymer, measured on a 1% strength solution in water, was 81.8.

Example 10

221.2 g of acrylic acid and 48.8 g of dimethylaminoethyl acrylate and 200 g of 50% strength sodium hydroxide solution for neutralization were reacted analogously to Example 8. The polymer solution had a pH of 7.2 and a solids content of 33.1%. The K value of the polymer, measured on a 1% strength solution in water, was 80.1.

Application in Leather Tanning

Example 11

(Self-tanning)

Pickled cattle pelt having a split thickness of 3 mm in 60% water and 5% of sodium chloride was adjusted at 20° C. to a pH of 4.5 using sodium formate and sodium bicarbonate. 35% of polymer 45 solution (=10% of active substance), prepared as described in Example 3, was subsequently diluted with water in a ratio of 1:1 and added to the cattle pelt. After a tanning time of 3 hours at 20° C., the pH of the liquor was re-adjusted to 4.5 using formic acid. The pelt was then treated with the tanning liquor for a further hour and then rinsed briefly. The shrinking temperature of the resultant leather was 79° C. After fatliquoring with 8% of a commercially available light-fast fatliquor and fixing with 0.4% of formic acid, the leather was dried and staked. The leather was distinguished by very good body and had good whiteness and excellent heat and light fastness properties.

Comparative Example A

Cattle pelt was used for self-tanning analogously to Example 11 with 10%, based on the solids content, of a commercially available polymethacrylic acid. The resultant leather had a shrinking temperature of 72° C. and, after fatliquoring and drying, had significantly lower body.

Example 12

(Re-tanning of Chrome Tanned Leather to Give Upholstery Leather)

A cattle wet blue with a shaved thickness of 1.2 mm was firstly washed with 300% of water at 30° C. and subsequently deacidified to a pH of 4.5 in 100% liquor at 30° C. using sodium formate and sodium carbonate. After a brief rinse, the leather was drum retanned at 40° C. in 100% liquor using 3%, based on the solid product, of the polymer prepared as described in Example 1. After drumming for 90 minutes, the leather was rinsed again and dyed in 100% liquor at 50° C. using 1% of a conventional metal complex leather dye, fatliquored with 8% of a commercially available fatliquor and adjusted to a pH of 4.0 using formic acid. The leather was racked overnight, then wet-stretched and dried. Sawdusting, staking and milling gave a soft leather with very good body, and intense, very even coloration and a fine mill grain.

Examples 13 to 18

(Retanning of Chrome Tanned Leather to Give Upholstery Leather)

In each example, 10%, based on the active substance, of the graft polymers from Examples 2 to 7 were used analogously to Example 12 for retanning chrome cattle leather. In all cases, soft leathers with good body and an attractive mill grain were obtained. In addition, the leathers were very evenly and intensely colored.

Comparative Example B (Retanning of Chrome Tanned Leather to Give Upholstery Leather)

A commercially available polymer based on methacrylic acid was used analogously to Example 12 for retanning. The resultant leather had a significantly paler color for the same amount of dye and had only low body.

Example 19

(Retanning of Chrome Tanned Leather to Give Shoe Uppers Leather)

A cattle wet blue with a shaved thickness of 1.8 mm was, in a conventional manner, rinsed, washed and subsequently deacidified to a pH of 4.4 in 100% liquor using sodium formate. After washing, the leather was drummed for 30 minutes in 100% of fresh liquor at 30° C., initially with 0.5% of a commercially available dispersant (phenolsulfonic acid-formaldehyde condensation product). The leather was then retanned at 30° C. in the same liquor with 2%, based on the solids content, of the graft polymer from Example 8. After drumming for 90 minutes, the leather was rinsed again. Coloring was carried out in 200% liquor using 1% of a commercially available leather dye at 40° C., and fatliquoring was carried out using 4% of a commercially available fatliquor. The pH was then adjusted to 3.6 using formic acid. After a brief rinse, the leather was stretched, dried and staked, giving a dark and very evenly colored leather with a very smooth grain.

Examples 20 and 21

(Retanning of Chrome Tanned Leather to Give Shoe Uppers Leather)

2%, based on the solids content, of graft polymer from Examples 9 and 10 were used as retanning agent analogously to Example 19. The leathers were again very deeply colored and had excellent body.

Example 22

(Retanning of Chrome Tanned Leather to Give Shoe Uppers Leather)

A cattle wet blue with a shaved thickness of 1.5 mm was, in a conventional manner, rinsed, washed and subsequently deacidified to a pH of 4.5 in 100% liquor using sodium formate and sodium carbonate. The leather was then drum retanned at 40° C. in 100% fresh liquor using 5%, based on the solids content, of the graft polymer from Example 3, drummed for 90 minutes and then rinsed again. Coloring was carried out in 100% liquor using 1% of a commercially available leather dye at 50° C. The leather was then fatliquored using a commercially available fatliquor, and the pH was adjusted to 3.8 using formic acid. After a brief rinse, the leather was stretched, dried and staked giving a deeply colored leather with very even coloring and excellent body.

Examples 23 and 24

(Retanning of Chrome Tanned Leather to Give Shoe Uppers Leather)

The retanning was carried out analogously to Example 22 using the polymers prepared as described in Examples 1 and 2. The resultant leather was somewhat darker even than in Example 22 with the same good body and evenness of color.

Comparative Example C (Retanning of Chrome Tanned Leather to Give Shoe Uppers Leather)

A commercially available retanning agent based on polymethacrylic acid was used analogously to Examples 22 to 24. Compared with Examples 22 to 24, the leather was significantly paler and had lower body.

We claim:

1. A process for the self-tanning, pretanning or assist tanning of leather pelts or skin pelts or for the retanning of leather or skins, which comprises:

treating said leather pelts or skin pelts with tanning agents of water-soluble or water-dispersible graft polymers of proteins which are obtained by freeradicalinitiated polymerization of:

(A) a monomer or monomer mixture comprising (a) from 20 to 100% by weight of acrylic acid or methacrylic acid or a mixture thereof or alkali metal, alkaline earth metal or ammonium salts thereof, (b) from 0 to 80% by weight of other monoethylenically unsaturated monomers which can be copolymerized with the monomers (a), and (c) from 0 to 5% by weight of monomers containing at least 2 ethylenically unsaturated, non-conjugated double bonds in the molecule, in the presence of proteins (B) in an A:B weight ratio of from (95 to 10):(5 to 95).

2. A process as claimed in claim 1, where the graft polymers have been prepared using, as component (b), of the monomer mixture A, crotonic acid, maleic acid, maleic anhydride, fumaric acid, citraconic acid, citraconic anhydride, $C_1$-$C_8$-alkyl or -hydroxyalkyl esters of acrylic acid, methacrylic acid or crotonic acid, mono- or di-$C_1$- to $C_8$-alkyl or -hydroxyalkyl esters of maleic acid, fumaric acid or citraconic acid, acrylamide, methacrylamide, methacrolein, acrylamidomethylpropanesulfonic acid, N-vinylimidazole or a mixture thereof.

3. A process as claimed in claim 1, where the graft polymers have been prepared using, as component (c) of the monomer mixture A, ethylene glycol diacrylate or glycol diacrylates of polyethylene glycols having a molecular weight of up to 3000, or a mixture thereof.

4. A process as claimed in claim 1, where the graft polymers have been prepared using, as monomer A, methacrylic acid or alkali metal, alkaline earth metal or ammonium salts thereof, alone or, as monomer mixture A, a mixture of at least 80% by weight of methacrylic acid or alkali metal, alkaline earth metal or ammonium salts thereof, and monomers (b).

5. A process as claimed in claim 1, where the graft polymers have been prepared using, as protein component B, bone glue or protein mixtures containing bone glue.

* * * * *